Nov. 21, 1950     J. F. CHAPMAN ET AL     2,530,945
ELECTRICAL INSTRUMENT ENCLOSURE
Filed Jan. 10, 1948                          2 Sheets-Sheet 1

WITNESSES:

INVENTORS
James F. Chapman and
Kolman Riesz.
BY
ATTORNEY

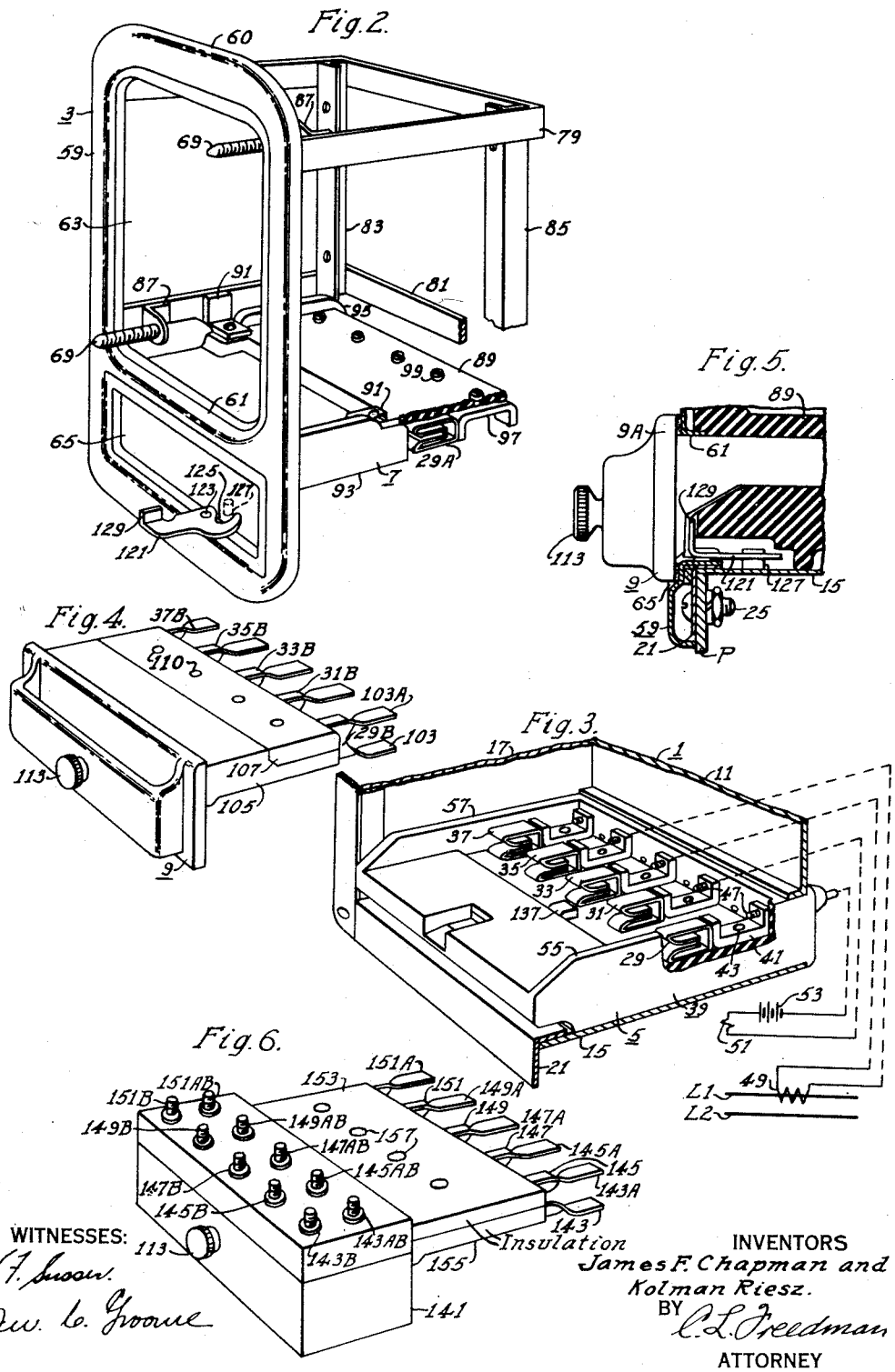

Patented Nov. 21, 1950

2,530,945

UNITED STATES PATENT OFFICE 2,530,945

ELECTRICAL INSTRUMENT ENCLOSURE

James F. Chapman, Madison, and Kolman Riesz, Gillette, N. J., assignors to Westinghouse Electric Corporation, East Pittsburgh, Pa., a corporation of Pennsylvania Application January 10, 1948, Serial No. 1,585

10 Claims. (Cl. 175—222)

This invention relates to electrical instrument units, and it has particular relation to units having enclosures for detachably receiving instruments.

In accordance with the invention, a casing is provided with a cover to which an electrical instrument is secured. The cover and casing respectively carry contact means, preferably of the contact jaw type. The contact means secured to the cover are electrically connected to the terminals of the instrument secured to the cover. The contact means associated with the casing are electrically connected to an external circuit. Connections between the contact means associated with the cover and with the casing are effected by means of a bridging device which may be inserted into the casing through an opening provided in the cover. The bridging device is interlocked with the cover to prevent removal of the cover and associated instrument from the casing prior to removal of the bridging device from its operative position with respect to the associated contact means. The bridging device may be replaced by a test plug through which connections may be made for the purpose of testing the electrical instrument.

It is an object of the invention to provide an improved enclosure for detachable instruments.

It is also an object of the invention to provide an improved enclosure for detachable instruments wherein contact blades and contact jaws are employed for establishing connections.

It is a further object of the invention to provide a casing and a cover for the casing to which an electrical instrument is secured for movement relative to the casing, the cover having an opening through which a bridging device may be inserted for establishing connections between contact means carried by the cover and contact means secured to the casing.

It is a still further object of the invention to provide apparatus as set forth in the preceding paragraph wherein an interlock prevents removal of the cover from the casing prior to removal of the bridging device from its operative position with respect to the contact means.

Other objects of the invention will be apparent from the following description taken in connection with the accompanying drawings, in which:

Fig. 2 is a view in perspective with parts broken away of a carriage assembly suitable for the instrument of Fig. 1;

Fig. 3 is a view in perspective with parts broken away and circuit elements schematically shown of a casing suitable for the instrument unit of Fig. 1;

Fig. 4 is a view in perspective of a bridging device employed in the instrument unit of Fig. 1;

Fig. 5 is a detail view in sectional elevation showing latching mechanism employed in the instrument unit of Fig. 1; and Fig. 6 is a view in perspective of a test plug which may be employed with the apparatus illustrated in Fig. 1.

Figure 1:
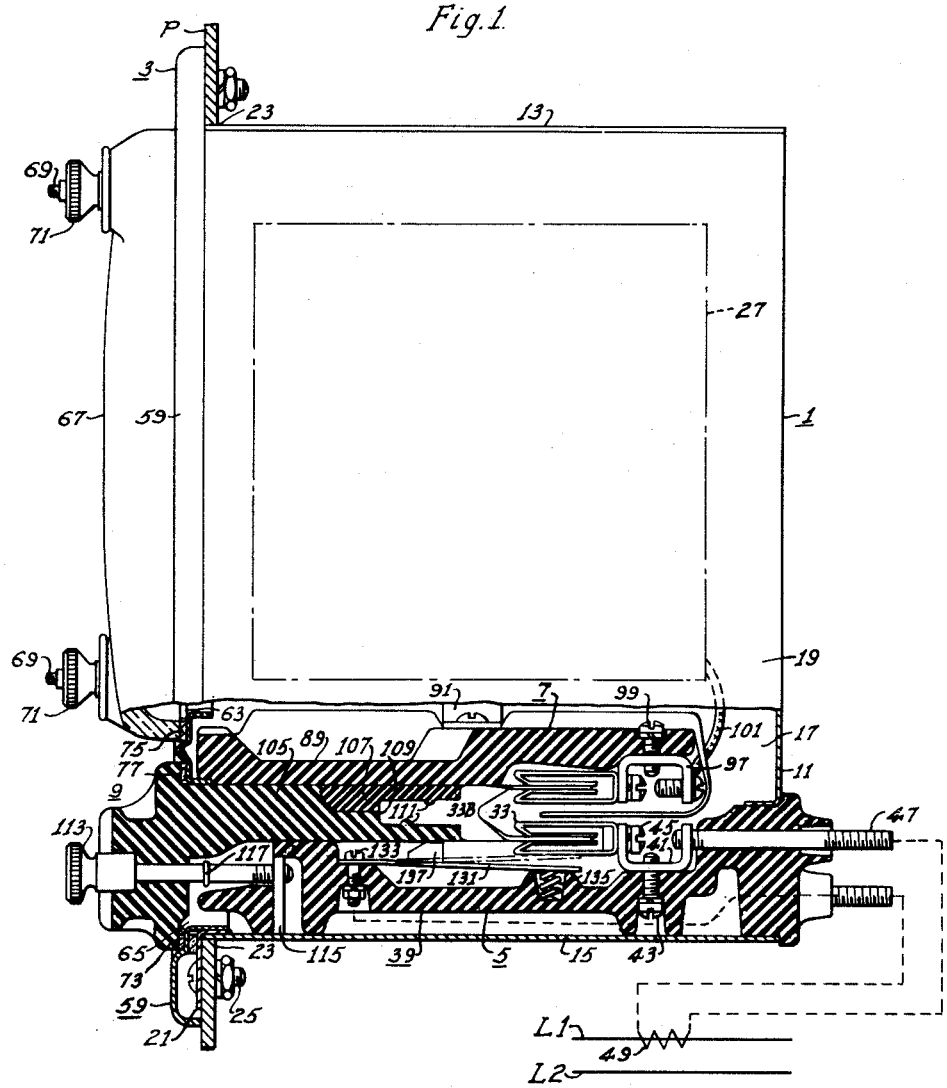
Figure 1 is a view in elevation with parts broken away and circuit elements schematically shown of an electrical instrument unit embodying the invention.

Referring to the drawings, Figure 1 shows an electrical instrument unit which includes a casing 1. The unit also includes a carriage assembly 3 which provides a cover for the casing and which is removable relative to the casing. The casing 1 has an electrical contact assembly 5 secured thereto, and the carriage assembly 3 has an electrical contact assembly 7 secured thereto for movement relative to the casing. A bridging device 9 is employed for establishing connections between contacts carried by the contact assemblies 5 and 7.

Referring first to the casing, it will be observed that the casing may be of any desired shape, but for switchboard mounting ordinarily would be of rectangular configuration. Conveniently, the casing may be constructed from a rear wall 11, a top wall 13, a bottom wall 15, and side walls 17 and 19. The front end of the casing is open and the opening is surrounded by a continuous flange 21. The flange may be constructed in any suitable manner. For example, the flange may be formed separately from the casing walls and may be secured to the walls in any suitable manner as by welding.

In order to mount the casing in a panel P which may be a switchboard panel, the panel is provided with an opening 23 through which the casing 1 is passed until the flange 21 engages the front surface of the panel. The casing may be secured to the panel P by means of bolts 25.

As previously pointed out, a contact assembly 5 is secured to the casing 1. This contact assembly includes a plurality of contact jaws. Jaw type contacts are desirable for the reason that such a contact applies equal contact pressures to the two faces of an associated contact blade. The resulting contact connection is very dependable.

The number of contact jaws to be employed depends on the number of contacts required by the electrical instrument 27 to be mounted in the enclosure formed in part by the casing, and represented in broken lines in Fig. 1. The specific instrument to be mounted may take various forms, for example, watt-hour meters, indicating measuring instruments and relays may be mounted in accordance with the invention. For the purpose of illustration, it will be assumed that the instrument 27 is a conventional overcurrent electrical relay.

Although it will be appreciated that the number of contact jaws may vary in accordance with requirements, for illustrative purposes five contact jaws 29, 31, 33, 35 and 37 are provided in the contact assembly 5 (Fig. 3). The contact assembly conveniently may include an insulating member 39 which may be molded from a suitable insulating material such as a phenolic resin. The insulating member 39 is suitably secured to the casing 1 and has five electro-conductive brackets 41 secured thereto at spaced intervals in any suitable manner as by means of machine screws 43. One bracket 41 is provided for each of the contact jaws. For example, as shown in Figure 1, the contact jaw 33 is secured to one end of the associated bracket 41 by means of a bolt 45. The other end of this bracket is electrically connected to a terminal 47 which has a threaded end accessible externally of the casing 11.

The terminals 47 facilitate connections of the associated contact jaws to an external circuit. For example, if the casing is to contain an overcurrent relay requiring two terminals for energization and two terminals for connection to the trip contacts of the relay, connections similar to those illustrated in Fig. 3 may be employed. According to these connections, the contact jaws 33 and 35 are connected across the secondary winding of a current transformer 49 which is associated with an external alternating current circuit represented by conductors L1 and L2. It will be understood that the contact jaws 33 and 35 will be connected to the relay for energizing the relay in a manner hereinafter set forth. In addition, the contact jaws 29 and 31 have connected in series thereacross a tripping solenoid 51 of a circuit interrupter and a source of electrical energy such as a battery 53. If the contact jaws 29 and 31 are connected through the trip contacts of the relay, the solenoid 51 will be energized to trip the associated circuit interrupter. With the connections illustrated, the contact jaw 37 is not required, and may be omitted if desired.

The insulating member 39 also includes guide rails 55 and 57 for supporting the carriage assembly and for guiding the carriage assembly towards and from its operative position with respect to the casing 1.

The carriage assembly 3 is shown in detail in Fig. 2. It will be noted that the carriage assembly includes a cover 59 having a rim 60 of generally rectangular shape. A strut 61 extends between two sides of the rim to provide the cover with two openings 63 and 65. Referring to Figure 1, it will be noted that the opening 63 is closed by an auxiliary cover 67 which is secured to the other parts of the carriage assembly by means of stud screws 69 and nuts 71. The opening 65 is closed by the bridging device 9. With the parts in the positions illustrated in Figure 1, the rim of the cover 59 surrounds the flange 21 and may have a gasket 73 interposed therebetween to provide a good seal between the cover and the casing. Gaskets 75 and 77 also may be provided for the auxiliary cover 67 and for the bridging device 9 to complete effective seals for the enclosure formed by the casing 1, the cover 59, the auxiliary cover 67 and the bridging device 9. Preferably, the auxiliary cover 67 is constructed of light-permeable material such as glass to permit inspection of the relay 27 therethrough.

Referring again to Fig. 2, it will be observed that a pair of U-shaped metal strips 79 and 81 are secured to the cover 59 and have reinforcing angles 83 and 85 extending therebetween to provide a skeleton or framework to which the instrument or relay 27 of Figure 1 may be secured. It will be noted that each of the screws 69 is secured to a bracket 87 which is attached to the framework.

The contact assembly 7 also is secured to the cover 59. This contact assembly includes an insulating member 89 which may be secured to brackets 91 carried by the framework. The insulating member 89 may extend into, and may be supported by, the strut 61. Two guide rails 93 and 95 are formed on the insulating member 89. It will be understood that the guide rails and other portions of the insulating member may be molded from an insulating material such as a phenolic resin. The guide rails 93 and 95 engage and slide over the rails 55 and 57 of the insulating member 39 when the carriage 3 is inserted in operative position and removed therefrom relative to the associated casing 1.

The insulating member 89 has secured thereto five contact jaws one for each of the contact jaws of the contact assembly 5. Each of the contact jaws 29, 31, 33, 35, and 37 (Fig. 3) has positioned thereabove one of the contact jaws secured to the insulating member 89 (Fig. 2). For purposes of identification, each of the contact jaws secured to the insulating member 89 will be given the reference character of the underlying contact jaw followed by the letter A. For example, the contact jaw 29A which is secured to the insulating member 89 overlies the contact member 29 of the contact assembly 5. As a further example in Figure 1, the contact jaw 33A overlies the contact jaw 33.

Each of the contact jaws carried by the insulating member 89 may be secured to the insulating member in a manner similar to that employed for securing the contact jaws of the contact assembly 5 to the associated insulating member. For example, the contact jaw 29A is secured to an electroconductive bracket 97 which, in turn, is secured to the insulating member 89 by means of a machine screw 99.

It will be understood that the instrument or relay 27 of Figure 1 has its leads or terminals connected to appropriate brackets 97. For example, the contact jaw 33A is connected to the relay 27 through its associated bracket 97 and a conductor or lead 101.

For the purpose of establishing connections between desired pairs of contact jaws, the bridging device 9 is provided with a plurality of bridging contacts. For example, in Figure 4, the bridging device 9 has five bridging contacts 29B, 31B, 33B, 35B and 37B. Each of the bridging contacts has two spaced horizontal contact blades. For example, the bridging contact 29B has contact blades 103 and 103A which are designed for reception, respectively, in the contact jaws 29 and 29A when the bridging device 9 is introduced into operative position with respect to the contact assemblies 5 and 7. In a similar manner, the bridging contacts 31B, 33B, 35B and 37B have horizontal contact blades for bridging pairs of contacts associated with the contact assemblies 5 and 7. As clearly shown in Figure 1, the bridging contact 33B has contact blades positioned for reception in the contact jaws 33 and 33A.

The bridging device 9 may have an insulating body formed of a suitable material such as a phenolic resin in which a portion of the bridging contacts are embedded for the purpose of retaining the bridging contacts in position. However, as shown in Figure 1, the bridging device 9 has an insulating member 105 and an insulating plate 107 secured thereto which are slotted to receive a tongue 109 which projects from each of the bridging contacts. The tongues 109 have notches 111 for receiving ribs 112 molded on the insulating member 105 and the plate 107. Consequently, when the plate 107 is secured to the member 105 in any suitable manner as by means of machine screws 119 (Fig. 4), the bridging contacts are anchored firmly in place.

If desired, the bridging device 9 may be provided with a locking screw 113 which has a threaded end engaging a nut 115. The nut 115 may be molded into the insulating member 39 or otherwise suitably secured thereto. The head of the screw 113 prevents removal of the bridging device until the screw is rotated to release it from the nut 115. A collar 117 on the screw prevents loss of the screw when the bridging device is removed. If the screw 113 projects through the nut 115 for a sufficient distance, the screw may be operated as a jack screw to force the bridging device into and out of operative position. Such operation of the jack screw may be desirable in installations wherein substantial contact pressure is developed by the contact jaws. However, it will be assumed for present purposes that the screw 113 is employed solely for locking and unlocking the bridging device with respect to the casing 1.

In order to prevent a false operation of the relay, it is desirable that an interlock be provided to require removal of the bridging device 9 before the relay can be removed from the casing 1. To this end, a latch 121 (Figs. 2 and 5) is pivoted to the cover 59 by means of a rivet 123. This latch is provided with a notch 125 for receiving a locking pin 127. As shown more clearly in Fig. 5, the pin 127 is secured to the bottom wall 15 of the casing 1. Consequently, when the pin is positioned in the notch 125, the carriage can not be removed from the casing 1. The latch 121 has a lip 129 which in latching position (Fig. 5) is positioned between the insulating member 39 and the head 9A of the bridging device 9. Consequently, the latch is completely inaccessible until the bridging device 9 is removed. Furthermore, since the latch in its open position projects beyond the cover 59, the bridging device 9 can not be inserted into operative position unless the latch is in latching position.

When current transformers such as the transformer 49 of Figure 1 are employed for energizing the relay 27, it is desirable that the secondary winding of the current transformer have a closed circuit connected across its terminals at all times. For this reason, an electroconductive leaf spring 131 has one end secured to the insulating member 39 by means of a bolt 133. The free end of the spring 131 is biased by means of a coil spring 135 toward the position illustrated in broken lines in Figure 1 wherein it engages a surface of the contact jaw 33. The contact jaw 33 and the bolt 133 are connected, respectively, to the terminals of the secondary winding of a current transformer 49 by means of conductors shown dotted in Figure 1.

The spring 131 is forced away from the contact jaw 33 by means of a cam 137 (Fig. 1). This cam is positioned in the path followed by the bridging device 9 when the bridging device is introduced between the insulating members 39 and 89. Consequently, as the bridging device is inserted into operative position, it engages the cam 137 to force the spring 131 away from the contact jaw 33. This movement of the spring occurs after the bridging element 33B has entered the contact jaws 33 and 33A to connect the secondary winding of the current transformer to the operating winding of the relay 27. It will be understood that as a bridging device is withdrawn from operative position, the spring 131 engages the contact jaw 33 before the bridging element 33B is completely withdrawn from its associated contact jaws.

When it is desired to test a relay or other instrument located in the casing 1, the bridging device 9 is removed from operative position and a test plug 141 (Fig. 6) is inserted in place of the bridging device. The test plug 141 has five lower contact blades 143, 145, 147, 149 and 151 which correspond to the lower contact blades of the bridging device shown in Fig. 4. Also, the test plug 141 has five upper contact blades 143A, 145A, 147A, 149A and 151A which correspond to the upper contact blades of Fig. 4. It should be noted, however, that the upper contact blades of Fig. 6 are completely insulated from the lower contact blades. The lower contact blades 143, 145, 147, 149 and 151 are connected, respectively, to terminals 143B to 151B. The upper contact blades 143A to 151A are connected, respectively, to contact terminals 143AB to 151AB. Consequently, the test plug 141 provides ten terminals, each connected to a separate one of the contact blades. When the test plug 141 is introduced into operative position, separate connections may be made to the various contact jaws through the exposed terminals of the test plug. The contact blades of Fig. 6 may have conductive extensions molded or otherwise secured in insulating members 153 and 155 which are secured to each other by means of screws 157.

It is believed that the operation of the apparatus herein described is apparent from the foregoing discussion. When a relay is to be mounted on a panel P, the casing 1 having the insulating member 39 and associated contact jaws and terminals in place, is secured to the panel P by means of bolts 25. The relay next is mounted in the carriage assembly illustrated in Fig. 2 and connections are made between the relay and the contact jaws of the carriage assembly through conductors such as the conductor 101 of Fig. 1. Next, the glass cover 67 may be secured in position over one of the openings in the cover 59 by means of the nuts 71. The complete carriage with the relay in position now may be inserted into the casing 1. During this operation, the rails 93 and 95 of the carriage (Fig. 2) slide over the rails 55 and 57 of the insulating member 39. After the carriage has been fully inserted into the casing 1, the latch 121 may be actuated to engage the pin 127 and thereby to secure the carriage assembly and relay in operative position.

The terminals 47 may be connected to external circuits or other switchboard wiring before or after insertion of the carriage in its associated casing. Usually such connections would be effected before insertion of the carriage.

Finally, the bridging device 9 is introduced to establish connections between the contact jaws of the carriage and of the casing. During the insertion of the bridging device, the leaf spring 131 is forced away from its contact jaw 33. The screw 113 may be rotated to enter the nut 115 and secure the bridging device in its operative position.

If tests are required for the relay 27, the bridging device 9 may be removed from its operative position. During such removal, the leaf spring 131 engages the contact jaw 33 to maintain a circuit across the secondary winding of the current transformer 49. Next, the test plug 141 of Fig. 6 is introduced in place of the bridging device. In order to prevent opening of the secondary winding of the current transformer 49 during introduction of the test plug 141, it is desirable that a connection be established between appropriate terminals of the test plug before insertion of the test plug. It should be noted that the bridging device 9 and the test plug 141 may be inserted and removed as desired without removing the cover 59 or the auxiliary glass cover 67 associated with the relay.

The contact blades of the bridging device and of the test plug are in spaced horizontal planes. Similarly, the contact jaws of the carriage 3 and of the casing 1 have contact surfaces in corresponding horizontal planes. Because of this horizontal orientation of the contact jaws, the vertical displacement of the contact jaws may be held to a minimum and the corresponding vertical dimensions of the bridging device and of the casing also may be held to a minimum without interference with the provision of adequate contact surfaces on the contact blades and the contact jaws.

In certain cases, it is desirable that certain contact blades engage their associated contact jaws in advance of the engagement between other contact blades and jaws. The proper sequence may be obtained by suitable dimensioning of the contact blades. For example, in Fig. 4, the bridging contact 37B has contact blades which are somewhat shorter than those of the remaining contact blades. Consequently, the contact blades of the bridging device 37B engage their associated contact jaws after engagement of the remaining contact jaws by their associated contact blades.

Although the invention has been described with reference to certain specific embodiments thereof, numerous modifications falling within the spirit and scope of the invention are possible.

We claim as our invention:

1. In an electrical instrument unit, a casing having an opening for receiving an electrical instrument and switch device, a cover for said casing having a periphery substantially coextensive with the periphery of the casing about said opening, said cover having an opening therein, and a switch device comprising contact means secured to the cover for removal therewith from the casing, said contact means being positioned substantially within the enclosure formed by the cover and the casing, contact means positioned within, and secured to, the casing, and an electroconductive bridging device insertable and removable through the opening in the cover for electroconductively connecting and disconnecting the contact means, said bridging device when in inserted position having a portion closing the opening in the cover for completing with the casing an enclosure for the electrical instrument and switch device.

2. A unit as defined in claim 1, in combination with a framework secured to said cover and extending into said casing to support an instrument for insertion in, and removal from, the casing in response to application and removal of the cover.

3. A unit as defined in claim 1, in combination with interlocking mechanism requiring removal of the bridging device from bridging position relative to the contact means before said cover can be removed from the casing.

4. A unit as defined in claim 1 wherein the cover has a second opening permitting inspection of an instrument located in the casing, in combination with a detachable auxiliary cover for the second opening.

5. In an electrical instrument unit, a first insulating support, a second insulating support, means mounting said supports for movement relative to each other, a separate contact jaw secured to each of said supports, each of the contact jaws comprising a pair of opposed parts for clamping a blade contact therebetween, said parts being resiliently biased into engagement with a blade contact positioned therebetween, and a detachable plug contact device having a separate blade contact positioned for reception in each of said contact jaws in response to movement of the plug contact device in a predetermined direction relative to the supports, each of the blade contacts comprising a pair of surfaces disposed to engage respectively the adjacent surfaces of one of the contact jaws within which the blade contact is inserted.

6. A unit as defined in claim 5 wherein said contact jaws have contact surfaces disposed in parallel spaced planes parallel to said predetermined direction, and wherein said blade contacts are disposed in parallel spaced planes parallel to said predetermined direction.

7. In an electrical instrument unit, a casing having an opening, a panel surrounding said opening, said casing being secured to the panel, a cover for the opening, said cover having a periphery substantially coextensive with the periphery of the casing about said opening, an electrical instrument secured to said cover and disposed within the casing, said instrument and cover being removable as a unit from the casing, a switch comprising first contact jaw means secured to and movable with said cover, said contact jaw means being electrically connected to the instrument, second contact jaw means secured to said casing, and a bridging device having separate knife blade means insertable in each of the contact jaw means for connecting the first and second contact jaw means, said cover having an opening permitting movement of said bridging device from a position external to the casing to a position substantially within the casing, the bridging device having a portion closing the opening in the cover and preventing removal of the cover from the casing prior to removal of the bridging device from the casing.

8. A unit as defined in claim 7, wherein the cover has a second opening permitting access to the instrument, in combination with an auxiliary cover for the second opening, said bridging device being removable from the cover and casing without disturbing the auxiliary cover.

9. A unit as claimed in claim 5 wherein the blade contacts are electrically connected to each other.

10. In an electrical instrument unit, a casing having an opening for receiving an electrical instrument and switch device, a cover for said casing having a periphery substantially coextensive with the periphery of the casing about said opening, said cover having an opening therein, and a switch device comprising contact means secured to the cover for removal therewith from the casing, said contact means being positioned substantially within the enclosure formed by the cover and the casing, contact means positioned within, and secured to, the casing, an electroconductive bridging device insertable and removable through the opening in the cover for electroconductively connecting and disconnecting the contact means, said bridging device when in inserted position having a portion closing the opening in the cover for completing with the casing an enclosure for the electrical instrument and switch device, said cover having a second opening permitting inspection of an instrument located in the casing, a detachable auxiliary cover for the second opening, and means securing the first-named cover to the casing to establish a substantial seal between the cover and the casing, said auxiliary cover being removable without disturbing said bridging device.

JAMES F. CHAPMAN.
KOLMAN RIESZ.

REFERENCES CITED

The following references are of record in the file of this patent:

UNITED STATES PATENTS

| Number | Name | Date |
|---|---|---|
| 1,869,936 | Griswold | Aug. 2, 1932 |
| 2,198,704 | Lazich | Apr. 30, 1940 |
| 2,227,967 | Favre | Jan. 7, 1941 |
| 2,227,970 | Hill | Jan. 7, 1941 |
| 2,388,675 | Chapman | Nov. 13, 1945 |